US007231216B2

(12) United States Patent
Tafazolli et al.

(10) Patent No.: US 7,231,216 B2
(45) Date of Patent: Jun. 12, 2007

(54) MOBILE POSITIONING USING INTERGRATED AD-HOC NETWORK

(75) Inventors: Rahim Tafazolli, Cheam (GB); Shahram Ghaheri-Niri, Guildford (GB); Jung Houn Yap, Guildford (GB)

(73) Assignee: University of Surrey, Guildford, Surrey (GB)

( * ) Notice: Subject to any disclaimer, the term of this patent is extended or adjusted under 35 U.S.C. 154(b) by 69 days.

(21) Appl. No.: 10/433,926

(22) PCT Filed: Dec. 5, 2001

(86) PCT No.: PCT/GB01/05384

§ 371 (c)(1), (2), (4) Date: Jun. 24, 2003

(87) PCT Pub. No.: WO02/47419

PCT Pub. Date: Jun. 13, 2002

(65) Prior Publication Data

US 2005/0075111 A1 Apr. 7, 2005

(30) Foreign Application Priority Data

Dec. 6, 2000 (GB) ................................ 0029739.0

(51) Int. Cl.
*H04Q 7/20* (2006.01)

(52) U.S. Cl. .............................. 455/456.1; 455/456.2; 455/456.3; 455/456.4; 455/456.5

(58) Field of Classification Search ............ 455/456.1, 455/456.2, 456.3, 456.4, 456.5, 456.6, 440, 455/456.7
See application file for complete search history.

(56) References Cited

U.S. PATENT DOCUMENTS

| | | | | |
|---|---|---|---|---|
| 5,390,339 | A * | 2/1995 | Bruckert et al. | 455/440 |
| 5,670,964 | A * | 9/1997 | Dent | 342/457 |
| 6,028,550 | A * | 2/2000 | Froeberg et al. | 342/357.13 |
| 6,078,808 | A * | 6/2000 | Fukutomi et al. | 455/412.2 |
| 6,347,228 | B1 * | 2/2002 | Ludden et al. | 455/456.5 |
| 6,526,039 | B1 * | 2/2003 | Dahlman et al. | 370/350 |
| 2002/0086682 | A1 * | 7/2002 | Naghian | 455/456 |

FOREIGN PATENT DOCUMENTS

| | | |
|---|---|---|
| EP | 1 030 531 | 8/2000 |
| GB | 2 254 508 | 10/1992 |
| WO | WO 99 11086 | 3/1999 |
| WO | WO 00 69199 | 11/2000 |

OTHER PUBLICATIONS

Pent et al.; Method for positioning GSM mobile stations using absolute time delay measurements; Electronics Letters, Nov. 20, 1997; vol. 33, No. 24.

* cited by examiner

*Primary Examiner*—Matthew Anderson
*Assistant Examiner*—Tuan Pham
(74) *Attorney, Agent, or Firm*—Leydig, Voit & Mayer, Ltd.

(57) ABSTRACT

A mobile station positioning method for a cellular communications system includes evaluating an initial position estimate of a target mobile station having an initial area of uncertainty, evaluating a position estimate of a further mobile station of the system, estimating distance between the target and further mobile stations and using the position and distance estimates to evaluate a new position estimate of the target mobile station having a reduced area of uncertainty. Bi-circular and tri-circular methods are described.

18 Claims, 14 Drawing Sheets

BS3
MSi
BS1
BS2
TA BS1=2
BS2=5
BS3=7

MOBILE POSITIONING USING INTERGRATED AD-HOC NETWORK

BACKGROUND OF THE INVENTION

The Federal Communications Commission (FCC) in United States requires all network providers to be able to determine all the mobile users locations to within an accuracy of 100 meters in 67% of call measurements for network based systems. The positioning capability is 3GPP system also has become one of the requirements. This highlights the importance of the need for an accurate positioning method within mobile systems.

The positioning of the mobile user could provide a wide range of services such emergency rescues, location based service, location-sensitive billing, fraud detection, cellular system design and resource management and also intelligent transportation systems. The cellular geo-locating of a mobile station (MS) uses the existing well established infrastructure of cellular base stations (BTS) to geo-locate the MSs as they transmit over standard cellular frequencies. The advantages of using cellular positioning system over GPS is less complexity in the handset (no need for GPS transmission) and therefore lower cost. Currently, there are several techniques that could be used in mobile positioning namely, the Time Of Arrival (TOA), Time Difference Of Arrival (TDOA), Angle Of Arrival (AOA) and also hybrid techniques. All these techniques use signal strength to determine distance between the MS and BTS. The TOA, TDOA and signal strength uses range prediction to determine the distance of a MS away from the BTS, and AOA uses the direction of arrival of signals to predetermine the angular displacement of the MS from the BTS. The above-mentioned techniques except AOA need at least three BTS to geo-locate the MS, i.e. tri-circular algorithm. This is shown schematically in FIG. 1.

The Observe Time Difference (OTD) and Timing Advance (TA) methods proposed for GSM uses the timing advance measurements to determine the distances between the MS and the BTS, i.e. at least three BTS are involved to estimate the user's position. The TA mechanism has not been foreseen as a means to estimate the exact range of the MS from the BTS but to ensure that the MS data reaches the BTS at its correct time slot (TA gives the round trip propagation delay time of the signal). This method therefore, suffers from one bit resolution error. In GSM 1 bit is equivalent to 3.6923 μs. This corresponds to ±553.845 m. Hence, even under ideal conditions, i.e. line of sight, no multi-path and no multiple access interference, a positioning method based on TA and Triangle BSS will still have an inaccuracy error of approximately ±553 meters (1106 m uncertainty).

SUMMARY OF THE INVENTION

According to one aspect of the invention there is provided a mobile station positioning method for a cellular communications system comprising, evaluating an initial position estimate of a target mobile station, the initial position estimate having an initial area of uncertainty, evaluating a position estimate of a further mobile station also having an area of uncertainty, evaluating an estimate of distance between said target mobile station and said further mobile station, and using said position and distance estimates to evaluate a new position estimate of the target mobile station having an area of uncertainty less than said initial area of uncertainty.

According to another aspect of the invention there is provided a mobile station positioning method for a cellular communications system comprising, evaluating an initial position estimate of a target mobile station, the initial position estimate having an initial area of uncertainty, evaluating a position estimate of a further mobile station having a further area of uncertainty, evaluating an estimate of distance between said target mobile station and said further mobile station, and reducing said initial area of uncertainty so that the resultant reduced area of uncertainty does not extend beyond said further area of uncertainty by more than the estimated distance.

BRIEF DESCRIPTION OF SEVERAL VIEWS OF THE DRAWINGS

The following is a more detailed description of some embodiments of the invention, by way of example, reference being made to the accompanying drawings in which.

DETAILED DESCRIPTION OF THE INVENTION

Described below are two novel methods to improve on the accuracy of the MS positioning. One of these methods also reduces signalling traffic to the network by reducing the numbers of BTS required for locating the MS. The two methods are a Tri-circular Ad-hoc locating Method and a Bi-circular Ad-hoc locating Method.

(I) Tri-Circular Ad-hoc Locating Method

Figure 1:
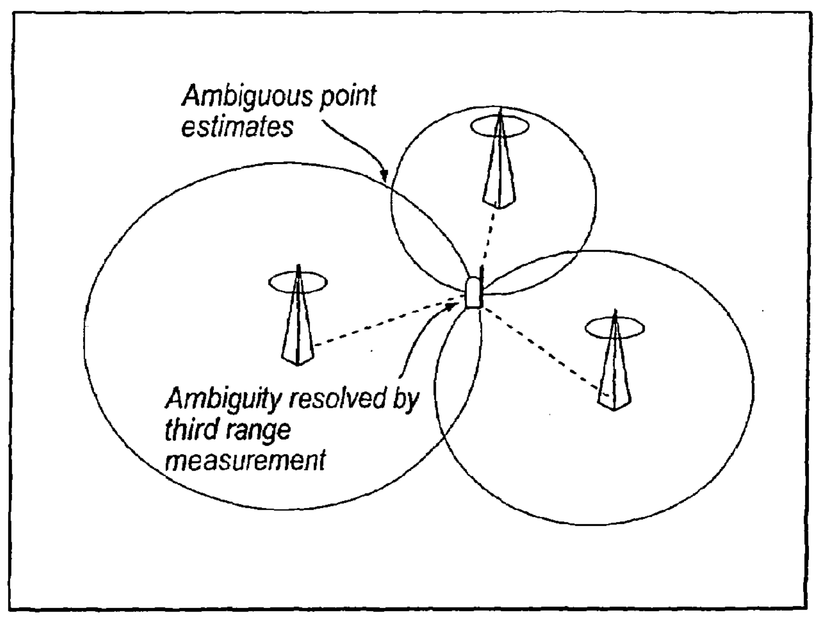
FIG. 1 is a schematic view of a tri-circular locating system of the prior art.
Figure 2:
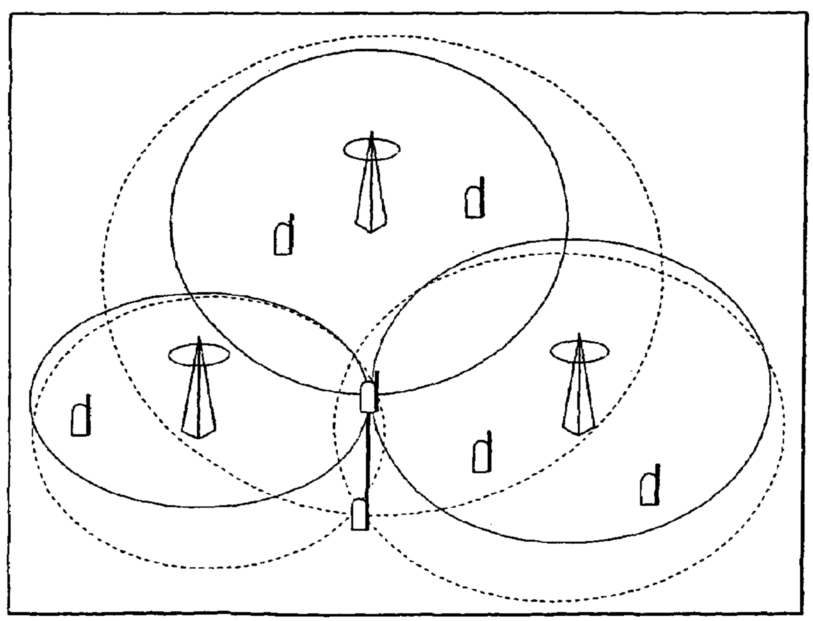
FIG. 2 is a schematic view of a tri-circular ad-hoc locating system.
Figure 3:
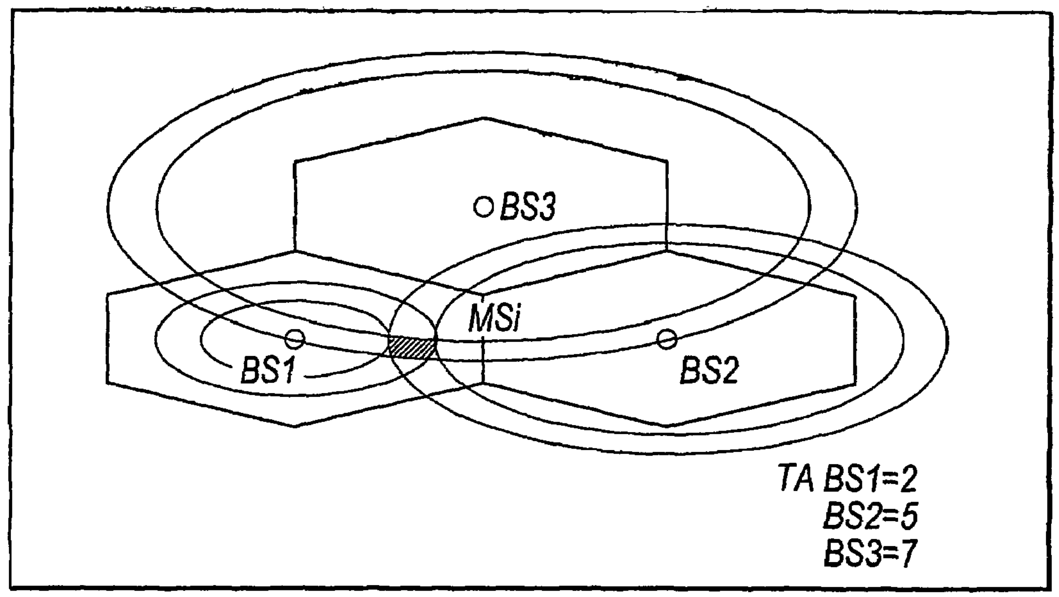
FIG. 3 is a schematic view of the signals from the system of FIG. 1 with the shaded part being the possible positions for Msi.

Under the ad hoc network, the MSs are able to communicate directly. If the MSi and the MSj can communicate directly, signals transmitted between the MSs can be used for range estimation. The two MS have the ability to estimate their range difference from each other, thus they will be able to assist each other to improve the estimated MS position. The first method based on Ad-Hoc mobile system, improves the position accuracy in TA-Triangle positioning method significantly. Referring to FIG. 3:

| | |
|---|---|
| Cell radius, r | 5 km |
| Ta | 553.845 m |
| MSi location* | (0.5 r, 0 r) |
| Area of shaded region | $3.9569ta^2$ |

*The location of MSi is with reference to a Cartesian (x, y) coordinate system.

Figure 4:
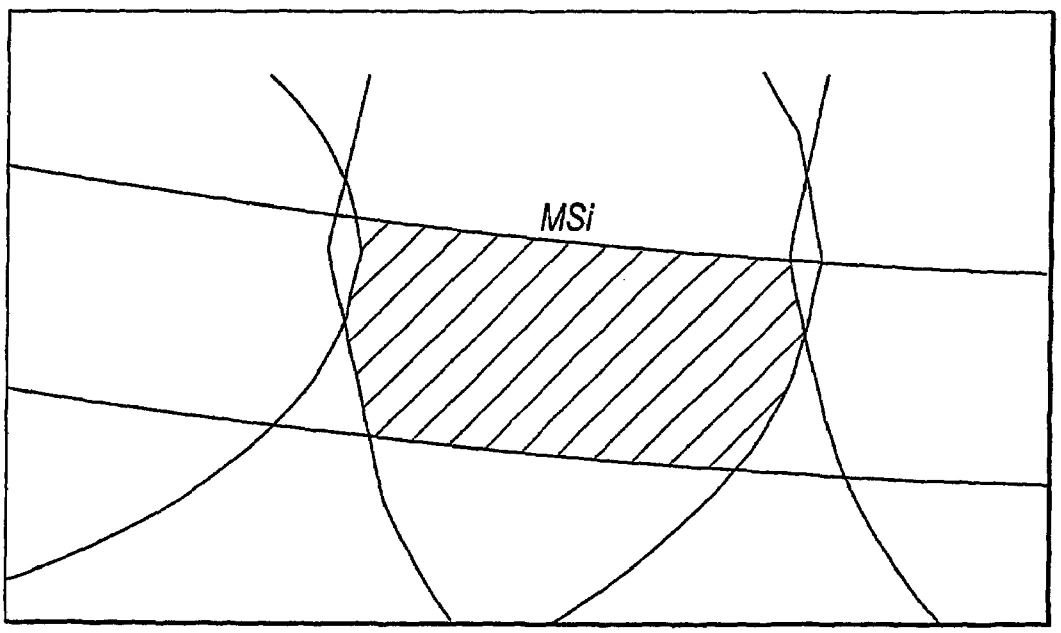
FIG. 4 is a close-up view of the shaded region of FIG. 3 showing the AoU of MS.

If only the TA 1 bit resolution error is considered, the area of the uncertainty (AoU, shaded region in FIG. 3) can be calculated. As shown in FIG. 3 the AoU for MSi is approximately $3,9569ta^2 \approx 1.21\ km^2$. FIG. 4 shows the close up view of the shaded region, and the boundaries of the shaded region is determined by the $\pm ta \approx 553.845$ m of the TA error. The MS must be somewhere in between the maximum and minimum range of the TA values, see FIG. 4. The TA values are calibrated in units of 1.108 km.

The exact distance of MSi away from BS1–3 is, $$R_1^2=(MS_ix-BS_1x)^2+(MS_iy-BS_1y)^2 \quad (1)$$

$$R_2^2=(MS_ix-BS_2x)^2+(MS_iy-BS_2y)^2 \quad (2)$$

$$R_3^2=(MS_ix-BS_3x)^2+(MS_iy-BS_3y)^2 \quad (3)$$

Due to the inaccuracy of TA in GSM, the range is $R_1$ min=2TA and $R_1$ max=2(TA+$err_{ta}$), while $err_{ta}$=553.845 m. The TA value must be chosen with $R_1\ min \leqq R_1 \leqq R_1\ max$.

The shaded region in FIG. 4 is the intersection of the three doughnuts from BTS1–3.

$$Area_{BS1} = 2\left[\int_{-x\,max}^{x\,max} BS_{1y} + \sqrt{R_{1max}^2 - (x - BS_{1x})^2}\,dx - \int_{-x\,min}^{x\,min} BS_{1y} + \sqrt{R_{1min}^2 - (x - BS_{1x})^2}\,dx\right] \quad (4)$$

x max=2(TA+$err_{ta}$) and x min=2TA

The shaded region will be $$Area=Area_{BS1}\cap Area_{BS2}\cap Area_{BS3} \quad (5)$$

Figure 5:
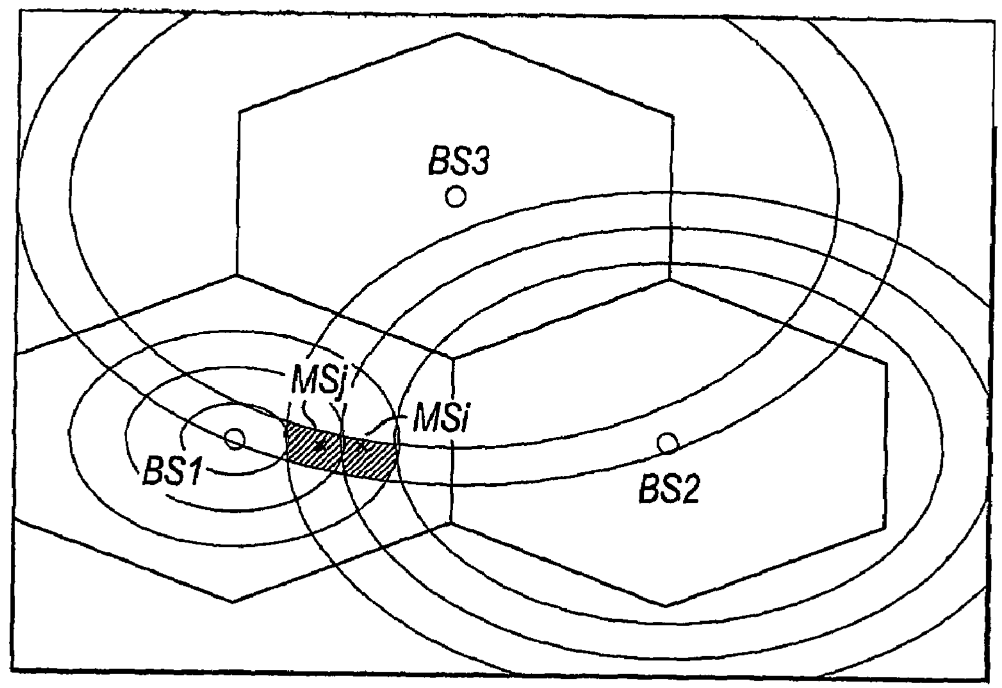
FIG. 5 is a schematic view of two MS in the BS1 region and close to each other.
Figure 5:
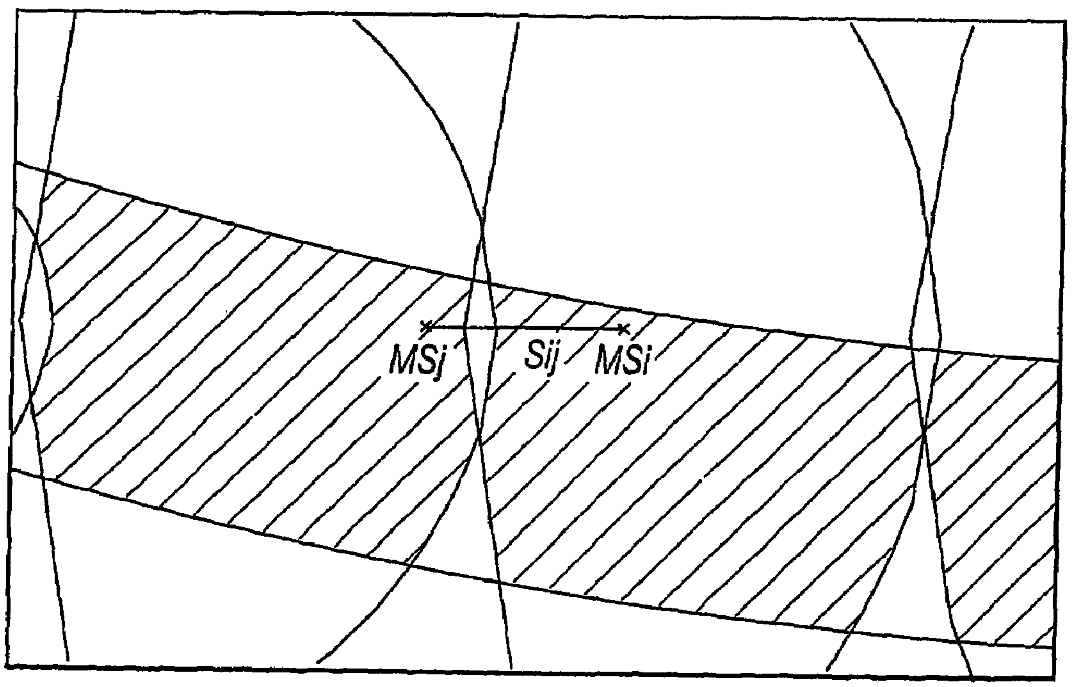

It is therefore highly desired to reduce the AoU caused by the TA error of GSM. The method proposed is assuming that the MSs are able to communicate directly. If the MSi and the MSj can communicate directly, the two MSs have the ability to estimate their distance from each other, thus they will be able to assist each other to reduce the AoU, see FIG. 5.

NUMERICAL EXAMPLE

| | |
|---|---|
| MSi location* | (0.5 r, 0 r) |
| MSj location* | (0.4 r, 0 r) |
| MSi TA values | BS1 = 2, BS2 = 5, BS3 = 7 |
| MSj TA values | BS1 = 1, BS2 = 6, BS3 = 7 |
| Sij | 0.1 r ± 20% |

*The locations of MSi and MSj are with reference to a Cartesian (x, y) coordinate system.

The MSi and MSj have the following TA values from the three BTSs:

MSi TA values: BS1=2 BS2=5 BS3=7 and MSj TA values: BS1=1 BS2=6 BS3=7. Assume that the two MS are able to determine their distance from each other with a certain degree of accuracy. The distance estimated Sij is equal to 0.1 r with an inaccuracy of ±20%. The possible locations of each MS must meet the following two criteria, (1) The possible locations must be within it own shaded region.

(2) The possible locations must be Sij distance away from any points within the other MS shaded area.

Figure 6A:
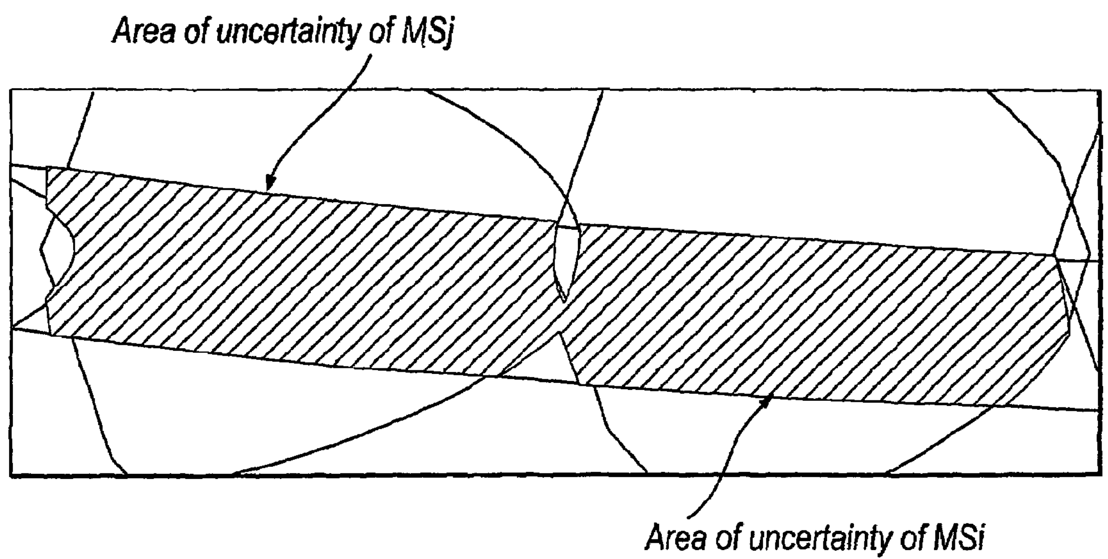
FIGS. 6*a* and 6*b* show the region of uncertainty for the two MSs and also the reduced AoU of Msi respectively.
Figure 6B:
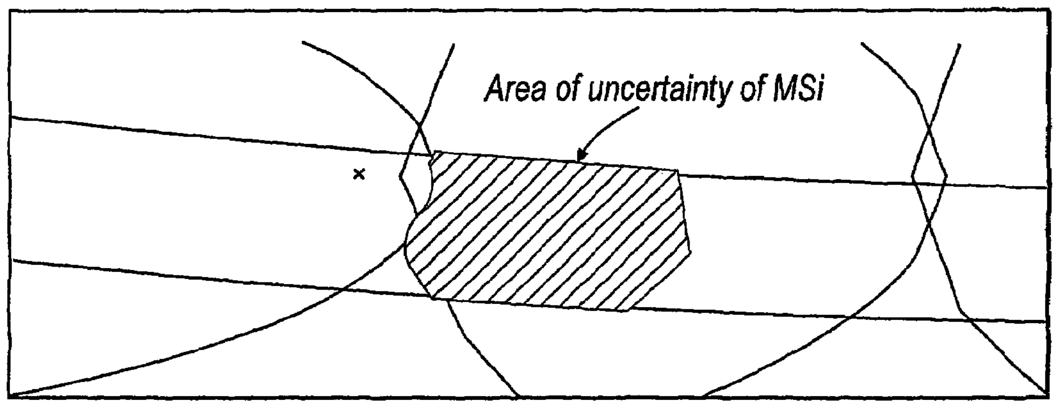
Figure 7A:
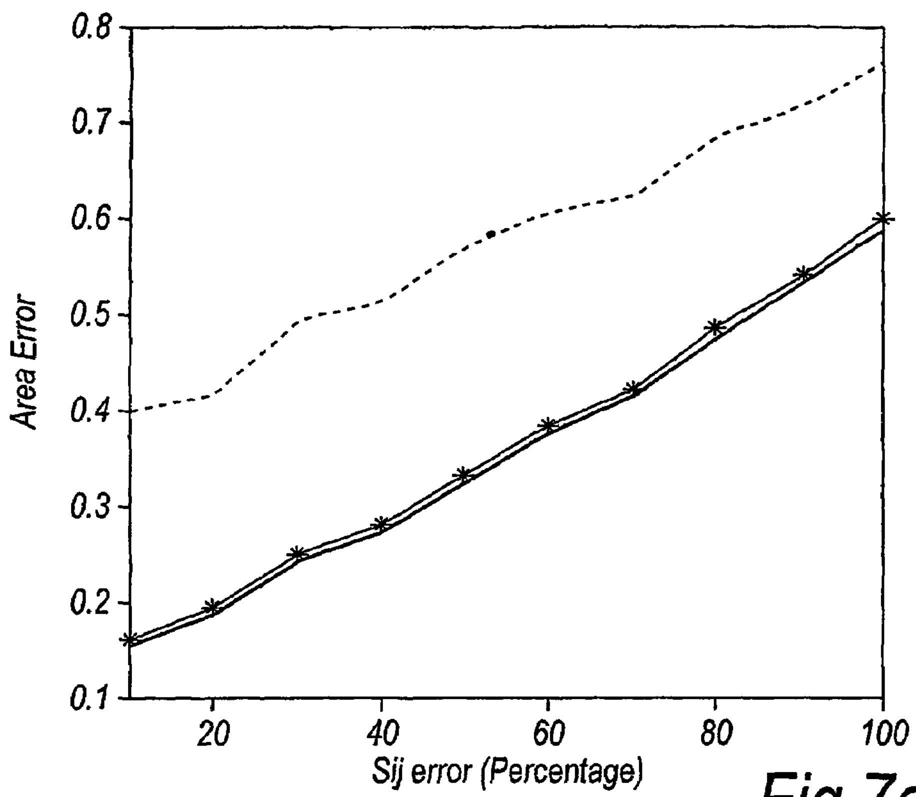
FIGS. 7*a*, 7*b*, 7*c* and 7*d* show plots of area error, mean error, improvement of area error and improvement of area error against percentage error in $S_{ij}$ for the system of FIGS. 2 to 6
Figure 7B:
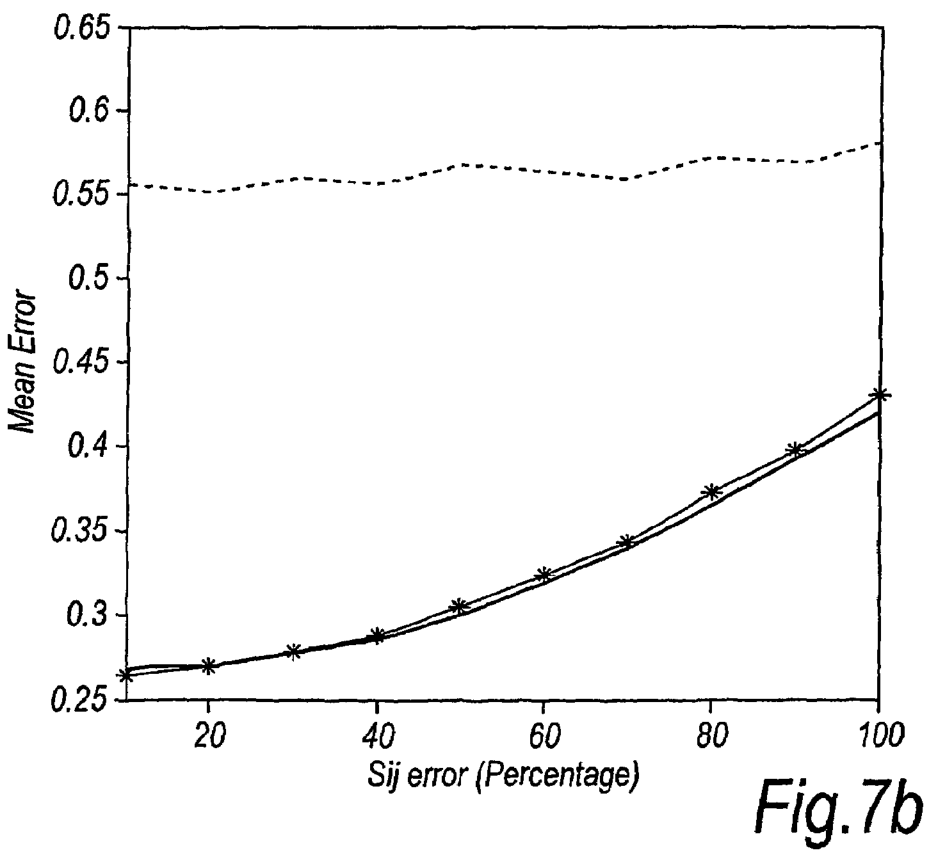
Figure 7C:
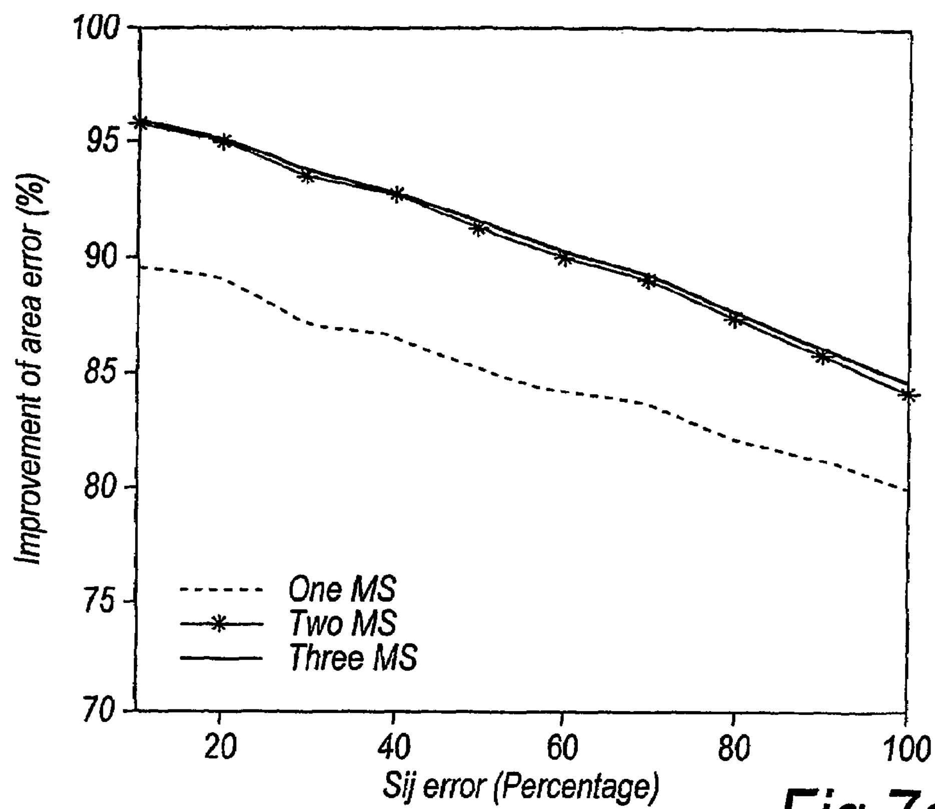
Figure 7D:
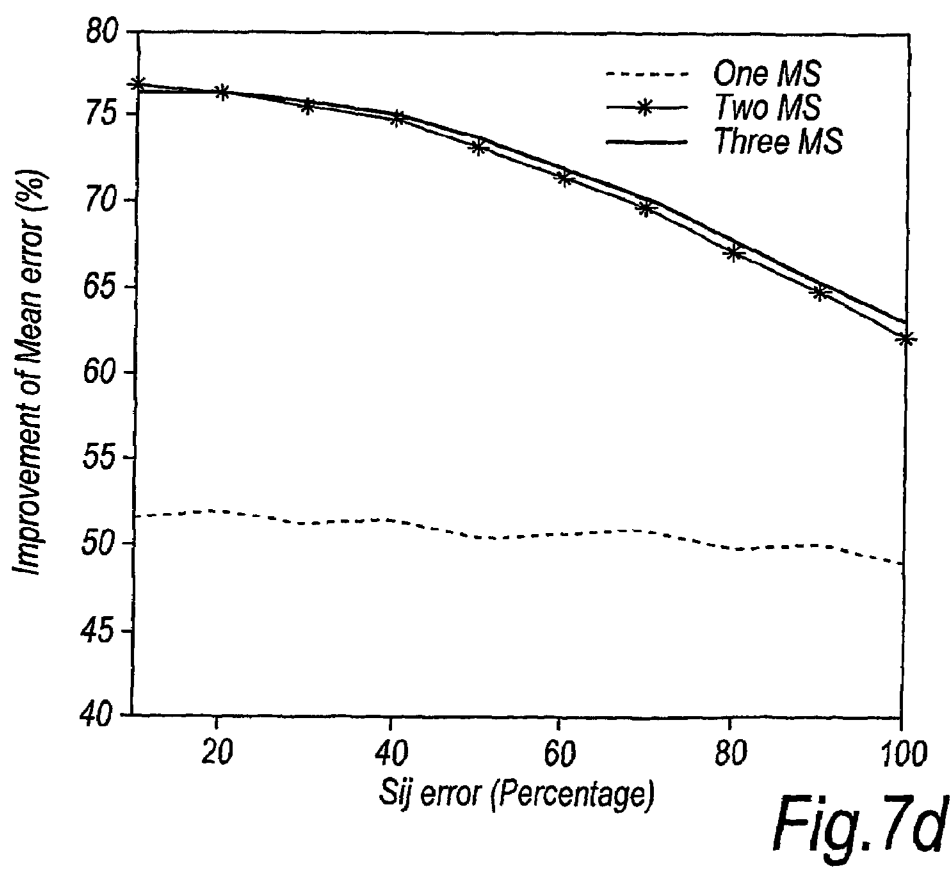

FIGS. 6*a* and 6*b* show the region of uncertainty for the two Mss and also the reduced AoU of MSi (which satisfied the above two conditions) respectively. FIG. 6*b* shows that the AoU of MSi is greatly reduced. The same method can also be applied to reduce the AoU of MSj.

FIGS. 7(*a*) to (*d*) show a case where one, two and three MS are used to improve the accuracy of locationing the MSi. The three MS are chosen to be approximately 0.2 ta≈100 m away from the MSi and each must have at least one TA value from any of three BSs different from MSi. FIGS. 7*a* and 7*b* show the AoU and the mean error with Sij having an error from 10% to 100%. FIGS. 7*c* and 7*d* show the improvement in percentage with Sij having an error from 10% to 100%.

In FIGS. 7(*a*) to 7(*d*), the Area Error=value x $err_{ta}^2$, where $err_{ta}$=553.845 meters.

(II) Bi-Circular Ad-hoc Locating Method

Figure 8:
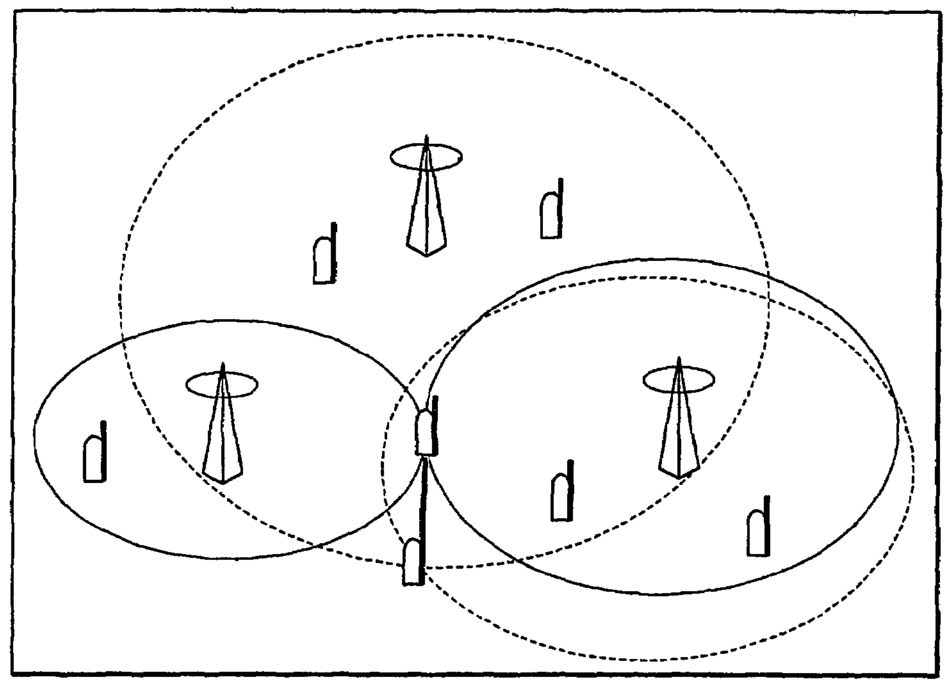
FIG. 8 is a schematic view of a bi-circular ad-hoc locating system.

Referring to FIG. 8, usually a minimum of 3 BTSs are required to locate the MS since 2 BTS will result in an ambiguity point (as there are usually two intersections point for two circles). However, it may not be possible at all times to have adequate hearing ability from three BTSs due to the fact that the user may not reside in the overlapping area therefore could not receive adequate signals from the other two BSSs at the same time. This implies that the positioning method may not be effective at all times. Additionally, the use of three BSS in the TA based positioning would requite two HandOvers (HOs) to other BSS if handover is used to determine the TAs. Apart from the extra signalling and therefore more complexity in the system, HO to the other two BSSs may not be feasible at all times due to the same reason as above. Consequently, tri-circular positioning may not be achievable at all times. In the second positioning technique, the number of BSSs is reduced to two only, thereby increasing the chance of positioning and also reducing the signalling and complexity in the system while maintaining the high accuracy in the positioning scheme.

The second method makes use of the fact that MSs can estimate their distances away from each other, and needs only 2 BTS to "pin-point" the MS location and solve the ambiguity problem. It is important to note that the one of the 2 BTS used to locate one of the MS must be different from the BTS used to locate the other MS, i.e. if BTS1 and BTS2 is used to locate MS1, than BTS2 and BTS3 or BTS1 and BTS3 are allowed to locate MS2.

Figure 9:
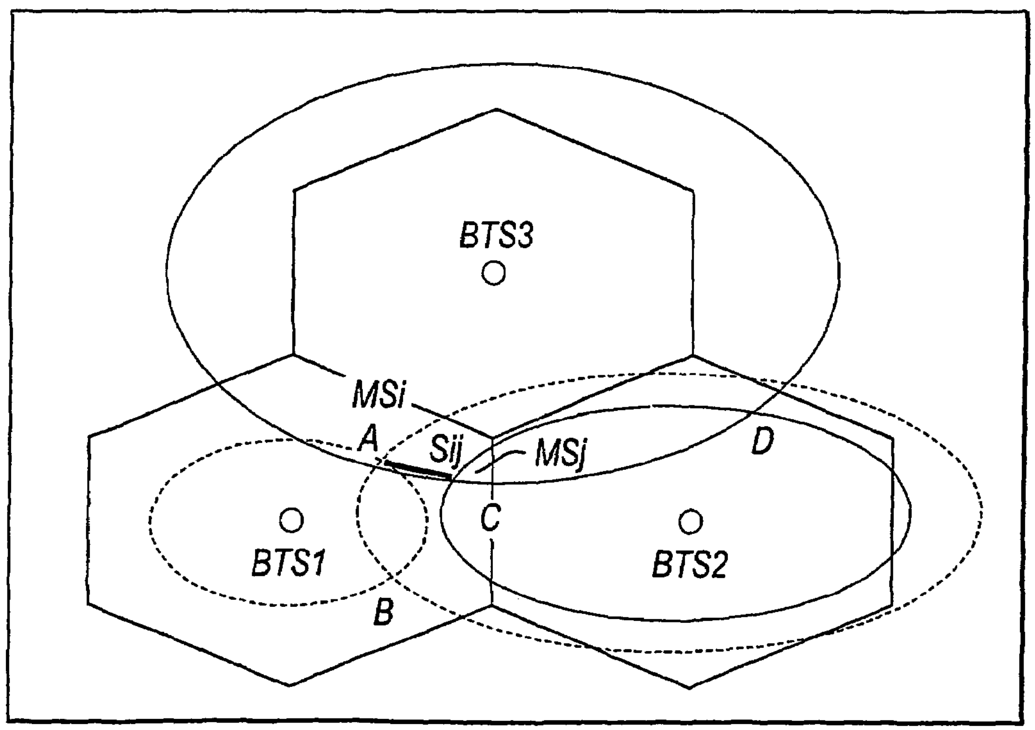
FIG. 9 is a schematic view of the use of two BTS to locate the MS location.

FIG. 9 shows the MSi at point A and MSj at point C. The distance between them is shown by Sij. The $MS_i$ is $R_{1i}$ away from the $BTS_1$ and $R_{2i}$ away from the $BTS_2$, and the $MS_j$ is $R_{2j}$ away from the $BTS_2$ and $R_{3j}$ away from the $BTS_3$.

$$R_{1i}^2 = (MS_i x - BS_1 x)^2 + (MS_i y - BS_1 y)^2 \tag{6}$$

$$R_{2i}^2 = (MS_i x - BS_2 x)^2 + (MS_i y - BS_2 y)^2 \tag{7}$$

$$S_{ij} = (MS_i x - MS_j x)^2 + (MS_i y - MS_j y)^2 \tag{8}$$

$$\text{Let } A = \frac{(R_{1i}^2 - R_{1j}^2 - BS_1 x^2 - BS_1 y^2 + BS_2 x^2 + BS_2 y^2)}{2}$$

$$MS_i x(BS_2 x - BS_1 x) + MS_i Y(BS_2 y - BS_1 y) = A \tag{9}$$

($MS_i x$,$MS_i y$) can be calculated by substituting equation 9 into equation 6 (the intersection points A and B). The points C and D for MSj can also be calculated using the same method. The intersection of two circles usually will give one extra ambiguity point, therefore following method is use to eliminate that ambiguity point. Now, there is a total of 2 possible locations for $MS_i$ and $MS_j$, but only the real location of $MS_i$ and $MS_j$ can satisfy equation 8.

$$MS_i=\{MS_i x_a, MS_i y_a; MS_i x_b, MS_i y_b\} \text{ and } MS_j=\{MS_j x_c, MS_j y_c; MS_j x_d, MS_j y_d\}$$

$$\hat{S}iy=\sqrt{(MS_i x - MS_j x)^2+(MS_i y - MS_j y)^2}$$

$$\hat{S}ij \approx S_{ij}, \qquad \text{True}$$

$$\hat{S}ij \diamond S_{ij}, \qquad \text{False}$$

$\hat{S}ij$ is the measured range difference between the MS.

Figure 10A:
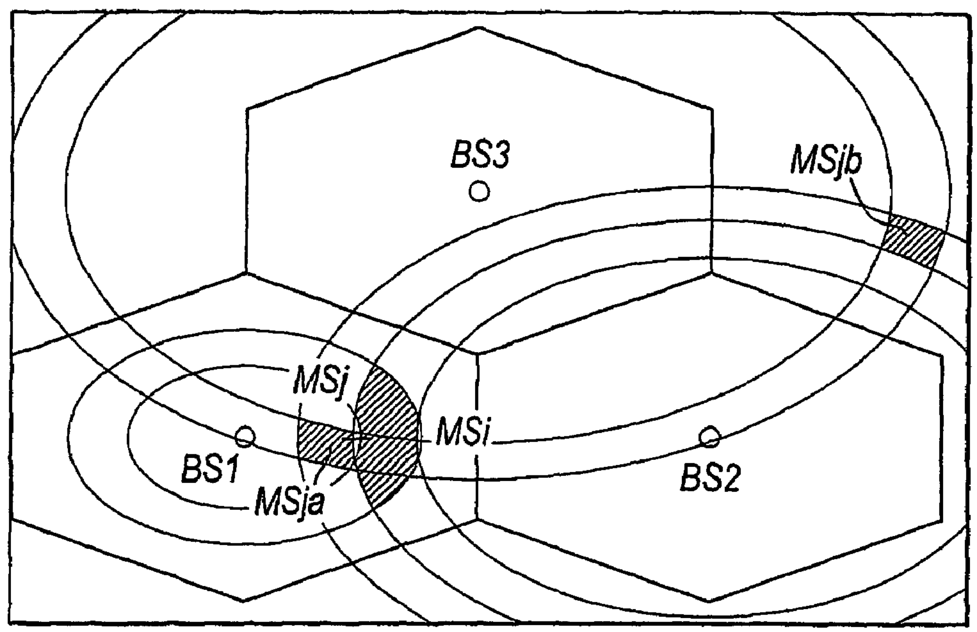
FIGS. 10*a* and 10*b* are schematic views, to larger and smaller scales respectively, of the operation of the system of FIGS. 8 and 9.
Figure 10B:
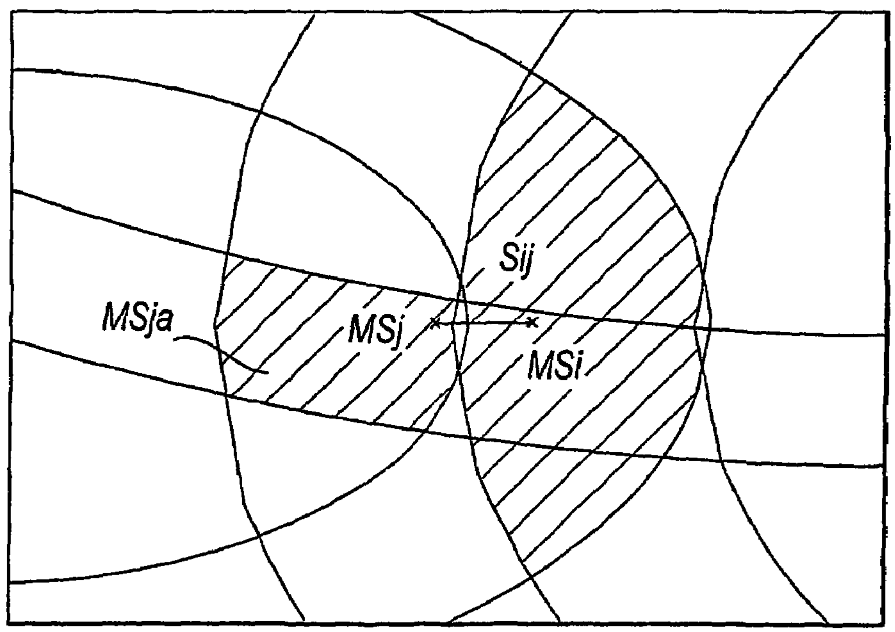

FIG. 10*a* shows that MSi and MSj is still at the same location but this time only BS1 and BS2 is used to track the location of MS1 and BS2 and BS3 is used to track the location of MSj. For this example MSi has an AoU of $Area_{MSia}$ and MSj have two AoU of $Area_{MSja}$ and $Area_{MSjb}$. But possible points at the $Area_{MSjb}$ are >>Sij, can be ignored. Thus, only the locations at the $Area_{MSja}$ and $Area_{MSia}$ need to be considered as shown in FIG. 10*b*.

| | |
|---|---|
| MSi location | (0.5 r, 0 r) |
| MSj location | (0.4 r, 0 r) |
| MSi TA values | BS1 = 2, BS2 = 5 |
| MSj TA values | BS2 = 6, BS3 = 7 |
| Sij | 0.1r ± 20% |
| Area of MSi | $11.1371ta^2$ |

NUMERICAL EXAMPLE

Figure 11A:
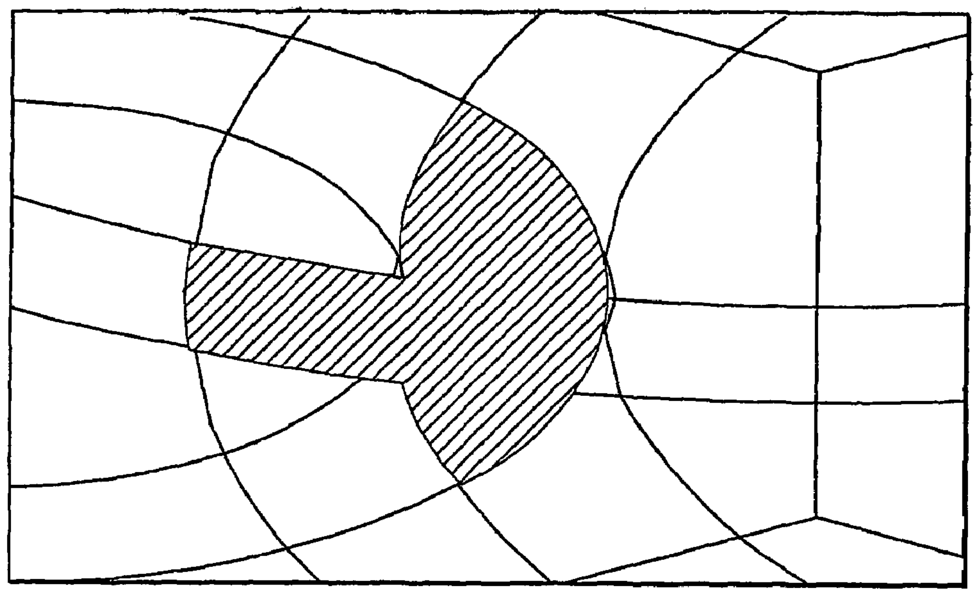
FIG. 11*a* shows an AoU of MSi and MSj of FIGS. 10*a* and 10*b*, the shaded region $Area_{MSia}$ is approximately $11.1371ta^2$.
Figure 11B:
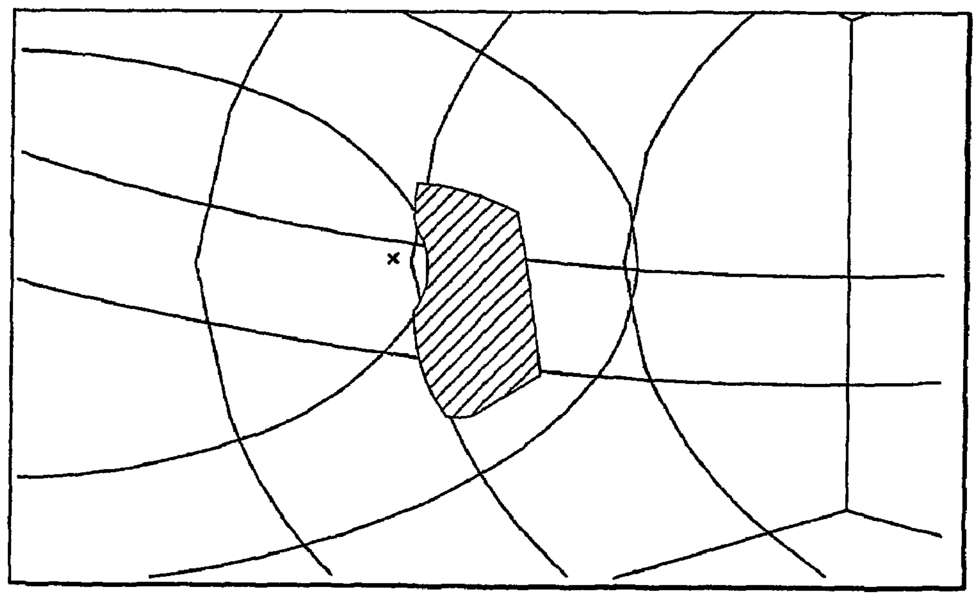
FIG. 11*b* shows the reduced AoU of MSi that satisfies two conditions.

The MSi and MSj have the following TA values from the two BSs, MSi TA values: BS1=2 BS2=5 and MSj TA values: BS2=6 BS3=7. The MSi exact location is at (0.5 r, 0 r) and MSj is at (0.4 r, 0 r), their distance estimated Sij is equal to 0.1 r with an inaccuracy of ±20%. It is important to note that the nearby assisting MS used to minimise the AoU of the target MS must at least use one BTS different from the target MS. If the MSi uses BS1 and BS2, then MSj can use either BS1 and BS3 or BS2 and BS3, but not BS1 and BS2. FIG. 11*a* shows the AoU of MSi and MSj, the shaded region $Area_{MSia}$ is approximately 11.1371 $ta^2$. FIG. 11*b* shows the reduced AoU of MSi that satisfies the above two conditions.

Figure 12A:
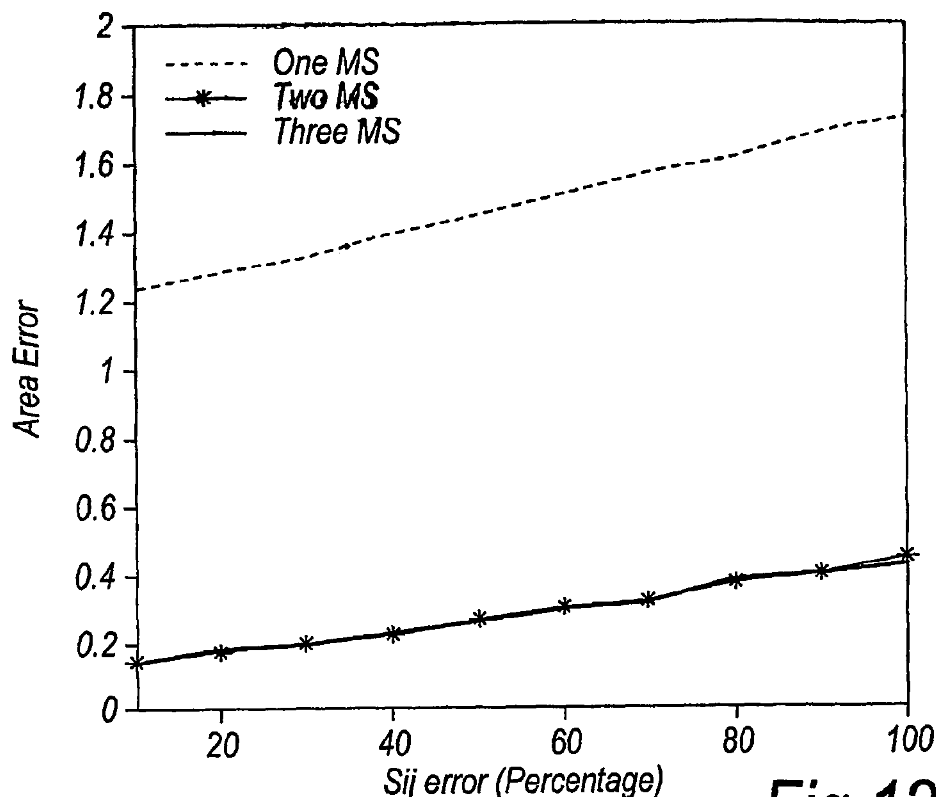
FIGS. 12*a*, 12*b*, 12*c* and 12*d* are plots of area error, mean error, improvement of area error and improvement of area error against percentage error in $S_{ij}$ for the system of FIGS. 8 to 11.
Figure 12B:
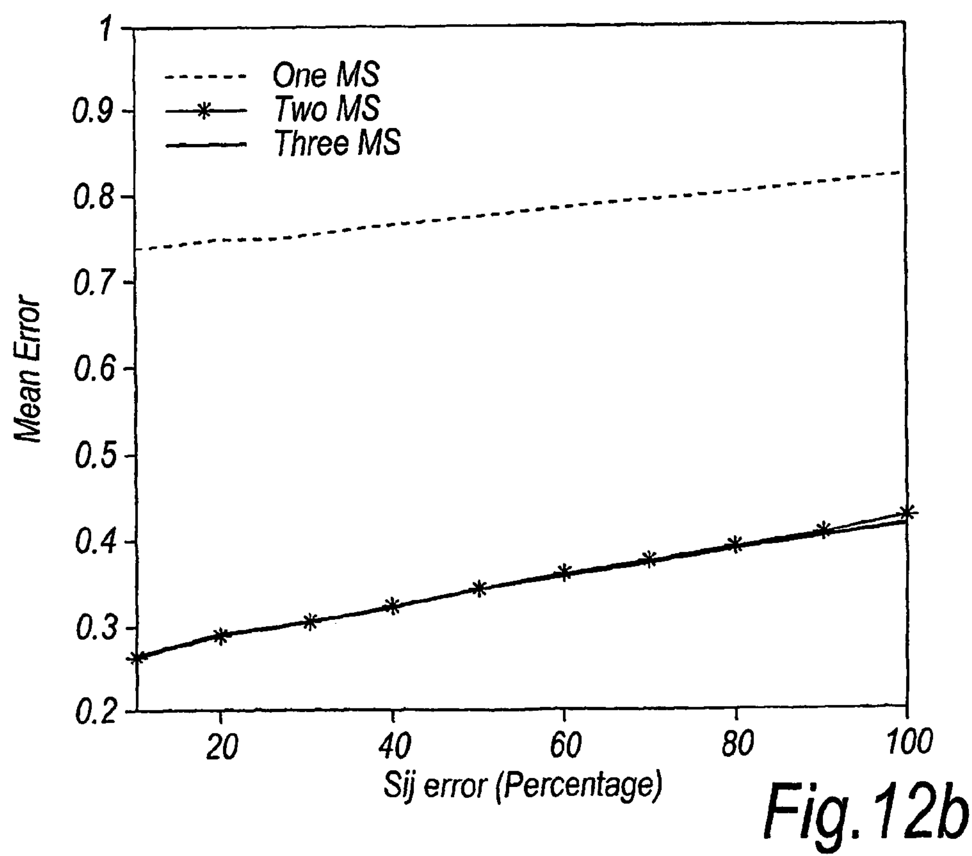
Figure 12C:
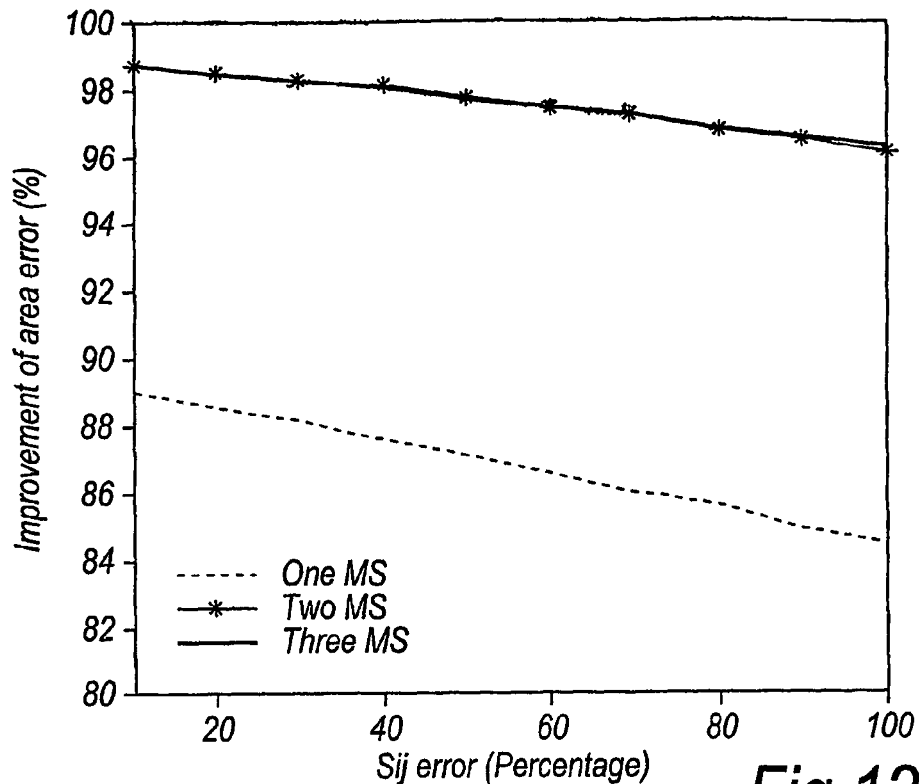
Figure 12D:
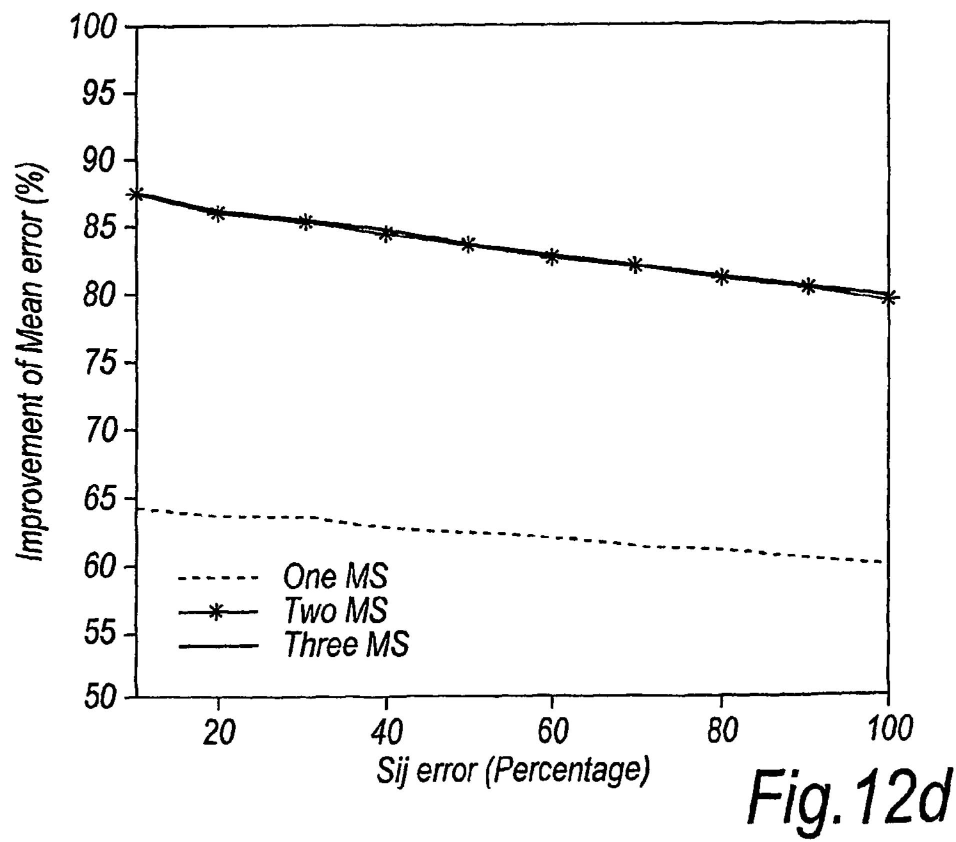
Figure 13:
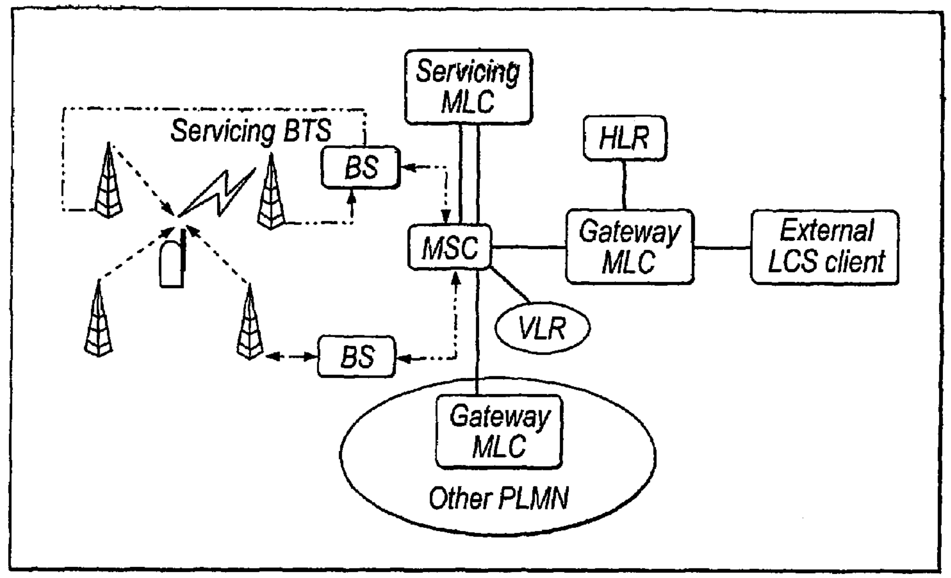
FIG. 13 is a schematic view of generic LCS logical architecture in a GSM system.

FIGS. 12*a* to 12*d* show a case where one, two and three MSs are used to improve the accuracy of locationing the MSi. The three MSs are also chosen to be approximately 0.2 ta away from the MSi. FIGS. 12*a* and 12*b* show the AoU and the mean error with Sij error ranging from 10% to 100%. FIGS. 12*c* and 12*d* show the improvement in percentage with Sij error ranging from 10% to 100%.

In the graphs, Area Error=value x $err_{ta}^2$, where $err_{ta}$=553.845 meters.

Implementation and Signaling Flow

The Location Services in GSM

The two proposed methods could readily be implemented into the GSM network, as the mobile positioning has already been foreseen as a value added service in GSM. The main requirements for implementing the proposed methods are the distance measurements between the BTS-MS and MS-MS. The BTS-MS distance/range measurement could be achieved by any of the current techniques, i.e. TOA, TDOA, AOA and OTD. The signaling for this purpose has already been defined. The MS-MS range/distance measurement could performed by using a ODMA (Opportunity Driven Multiple Access) protocol. The signaling for this purpose is proposed and illustrated in FIG. 16.

Figure 15:
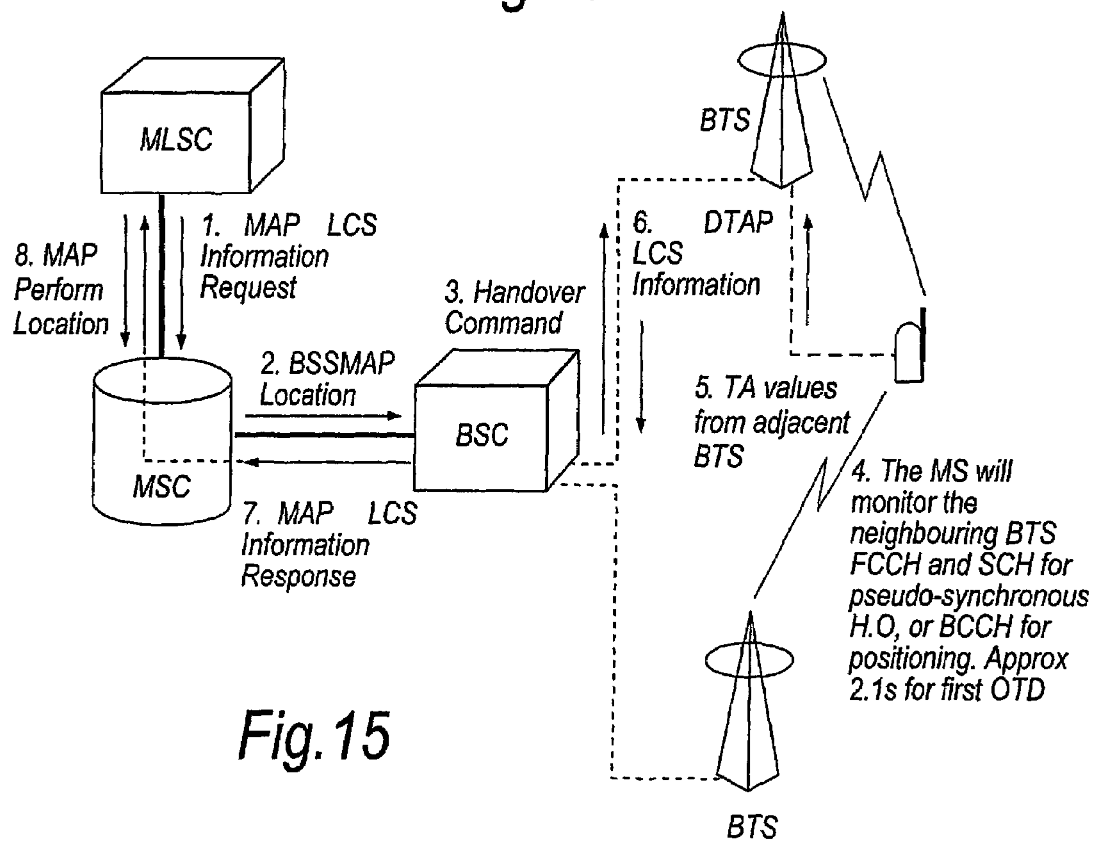
FIG. 15 is a schematic view of a BTS-MS distance/range measurement signaling system.
Figure 14:
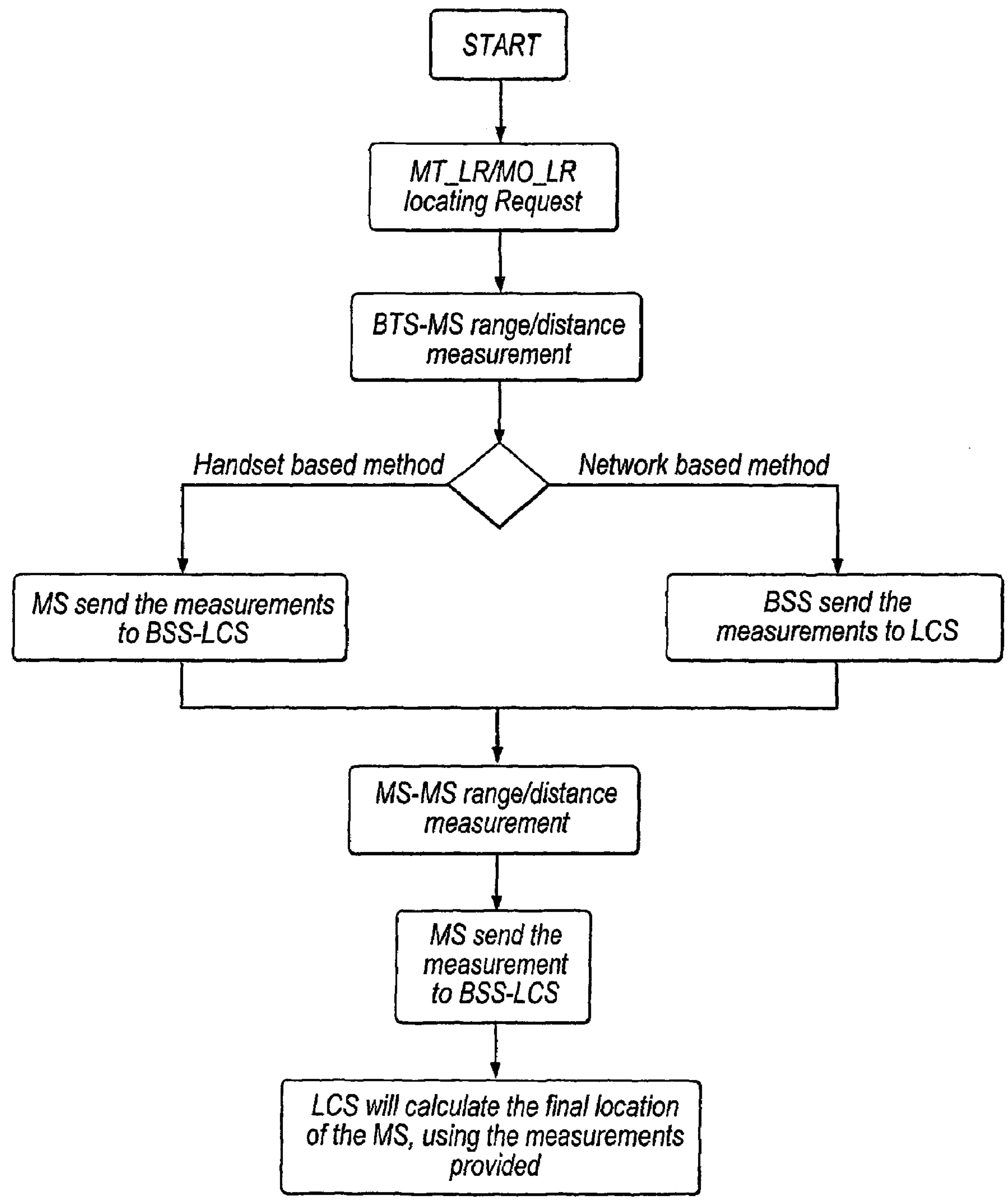
FIG. 14 is a positioning flowchart for the system of FIG. 13.

FIG. 14 illustrates the positioning flowchart. Currently, the LoCation Services (LCS) feature of the GSM foresees necessary signaling for a Mobile Originating, or Mobile Terminating Location Request (MT_LR) i.e. a request for the MS position from an LCS client where the client is treated as being external to the PLMN to which the location request is made. The base station substation (BSS) is involved in the measurement of the TA values and Cell-id to the Mobile station Controller (MSC). The Servicing Mobile Location Center (SMLC) will manage the overall coordination and scheduling of resources required to perform positioning of the MS may also calculate the final location estimate and accuracy using the measurements provided by the BSS. The Gateway Mobile Location Center (GMLC) is the first node of external LCS client access to the GSM PLMN. After performing registration authorization, it sends a positioning request to and receives final location estimates from the MSC. The distance measurements between the BTS and MS can be achieved in the present GSM system. The signaling flow for the BTS-MS range estimation using OTD is shown in FIG. 15. But in order to implement the proposed techniques, new features must be added into the network.

(1) The MS must be able to measure the neighboring MS range difference and know their geo-location, if it is an mobile base positioning method.

(2) The network must be able to retrieve the MS-MS range measurement from the MS and know the neighboring MS geo-location, if it is a network base positioning method.

The BTS-MS Range/Distance Measurement

The LCS utilizes one or more positioning to mechanisms to determine the location of the MS. The mechanisms proposed for the LCS: Timing Advance (TA) Based Positioning, Uplink TOA, Observed Time Difference (OTD), and GPS assisted. If the OTD method is chosen, the signaling requirements to measure the BTS MS range different and the MS-MS range measurement is as follows. As can be seen in FIG. 15, the MS upon the network request (Mobile Terminating Location Request), attempts to estimate the BTS-MS distance. The necessary GSM channels, i.e. MAP, BSSMAP and DTAP, for carrying the messages are shown.

MS-MS Range/Distance Measurement

Figure 16:
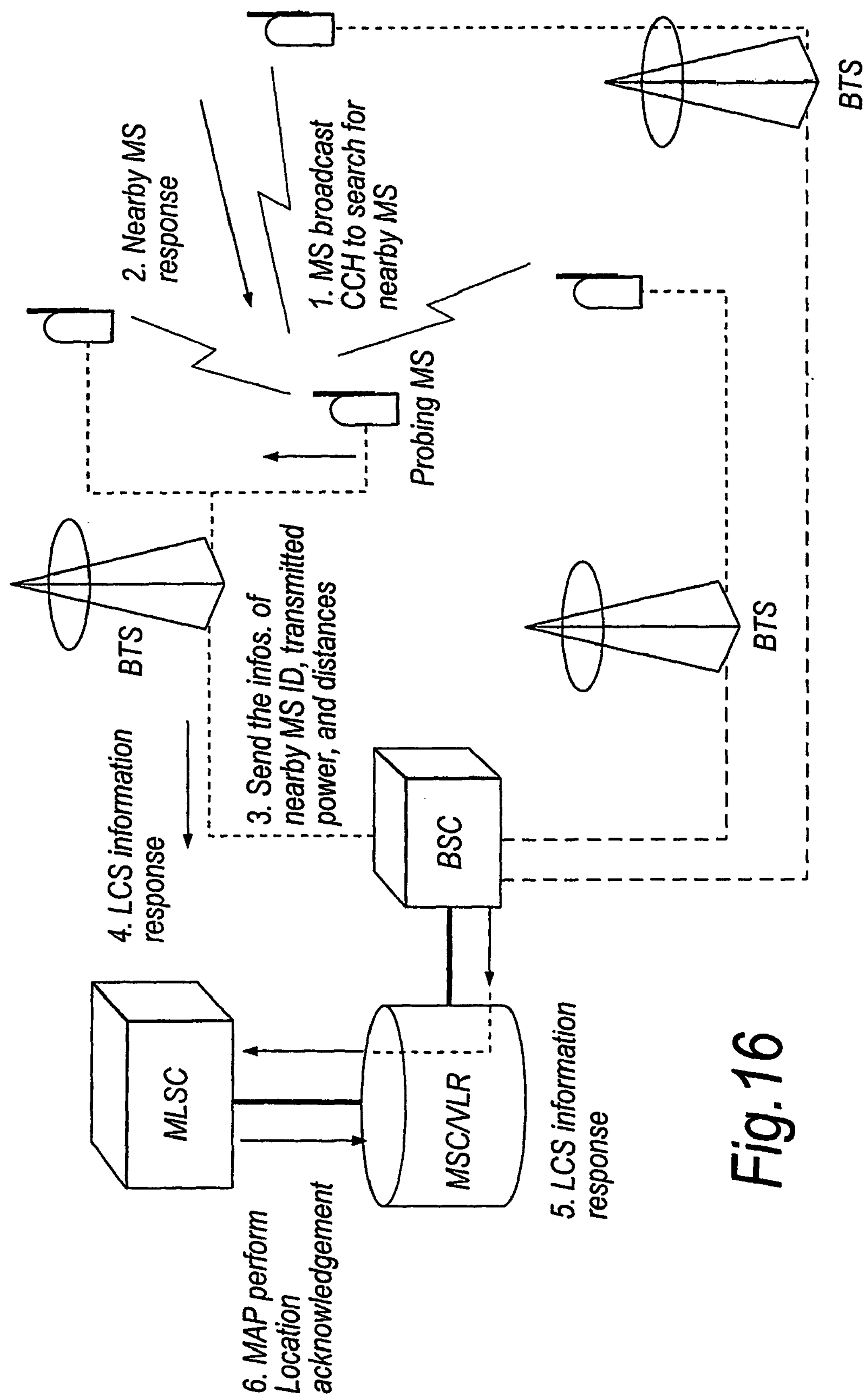
FIG. 16 is a schematic view of an MS—MS range/distance measurement signaling flow system

The next step is the MS-MS distance estimation to help reduce the AoU achieved in the BTS-MS distance estimation. A possible method for MS-MS signalling is the ODMA (Opportunity Driven Multiple Access) protocol. Under (ODMA) protocol, probe-response mechanism in the MS enables it to build a neighbour list that contains at least 5 MS within its nearby area. The MS will broadcast probes on the Calling Channel (CCH). When a nearby MS receives the CCH it will respond and transmit a characteristic response signal to the probing MS, and the responding MS will be included in the neighbour list (MS ID). During the connectivity with the nearby MS, the responding MS ID, transmit power and range can be measured and stored in the neighbour list. The method is illustrated in FIG. 16.

Two novel methods are proposed for positioning in a mobile system. The methods have been evaluated and verified analytically and via simulation. The first proposed method (based on conventional tri-circular method) gives an improvement of 60%–85% by means of reduction in the AoU depending on the use of one to three MSs to assist the positioning. The improvement is even increased by the second proposed method to 85%–98%. Nevertheless, considering the initial size of AoU, the first method results in more accurate positioning. The second proposed method while maintaining a very high accuracy by using two BTS only instead of three (conventional tri-circular) results in a higher possibility of positioning, less implementation complexity, a faster positioning and also lower signaling traffic and resource usage. It is believed that the methods can be easily applied to any other positioning techniques in mobile system to improve the accuracy.

The invention claimed is:

1. A mobile station positioning method for a cellular communications system comprising, evaluating an initial position estimate of a target mobile station, the initial position estimate having an initial area of uncertainty, evaluating a position estimate of a further mobile station also having an area of uncertainty, evaluating an estimate of distance between said target mobile station and said further mobile station, and using said initial position estimate of a target mobile station, said position estimate of a further mobile station, and said estimate of distance between said target mobile station and said further mobile station to evaluate a new position estimate of the target mobile station having an area of uncertainty less than said initial area of uncertainty.

2. The method as claimed in claim 1 including evaluating position estimates of at least two said further mobile stations, evaluating the corresponding said distance estimates and using all the position and distance estimates to evaluate said new position estimate.

3. The method as claimed in claim 2 wherein each said position estimate is evaluated from signals transmitted between the respective mobile station and a group of three neighboring base stations of the system.

4. The method as claimed in claim 3 wherein said position estimates are all evaluated using the same group of neighboring base stations.

5. The method as claimed in claim 2 wherein said initial position estimate and the position estimate of a said further mobile station are evaluated from signals transmitted between the respective mobile stations and different pairs of a group of three neighboring base stations of the system.

6. The method as claimed in claim 1 wherein each said position estimate is evaluated from signals transmitted between the respective mobile station and a group of three neighboring base stations of the system.

7. The method as claimed in claim 6 wherein said position estimates are all evaluated using the same group of neighboring base stations.

8. The method as claimed in claim 1 wherein said initial position estimate and the position estimate of a said further mobile station are evaluated from signals transmitted between the respective mobile stations and different pairs of a group of three neighboring base stations of the system.

9. The method as claimed in claim 1 wherein said position estimates are evaluated using Timing Advance signals.

10. The method as claimed in claim 1 wherein said position estimates are evaluated using a cellular positioning method.

11. The method as claimed in claim 10 wherein said cellular position method comprises at least one positioning method selected from a Timing Advance-based method, a Time Difference of Arrival method and an Observed Time Difference method.

12. The method as claimed in claim 1 wherein said position estimates are evaluated using a GPS-assisted method.

13. The method as claimed in claim 12 wherein said distance estimate is evaluated using an Opportunity Driven Multiple Access (ODMA) protocol.

14. The method as claimed in claim 1 wherein said distance estimate is evaluated in a said mobile station.

15. The method as claimed in claim 1 for use in a GSM cellular communications system.

16. A mobile station positioning method for a cellular communications system comprising, evaluating an initial position estimate of a target mobile station, the initial position estimate having an initial area of uncertainty, evaluating a position estimate of a further mobile station having a further area of uncertainty, evaluating an estimate of distance between said target mobile station and said further mobile station, and reducing said initial area of uncertainty so that the resultant reduced area of uncertainty does not extend beyond said further area of uncertainty by more than the estimated distance.

17. The cellular communications system adapted to perform the method according to claim 1.

18. The system according to claim 17 being a GSM cellular communications system.

* * * * *